United States Patent
Shigesato et al.

(10) Patent No.: US 12,037,260 B2
(45) Date of Patent: Jul. 16, 2024

(54) NANO METAL COMPOUND PARTICLES, COATING MATERIAL AND FILM USING THE SAME, METHOD FOR PRODUCING FILM, AND METHOD OF PRODUCING NANO METAL COMPOUND PARTICLES

(71) Applicants: KABUSHIKI KAISHA TOSHIBA, Tokyo (JP); TOSHIBA MATERIALS CO., LTD., Yokohama (JP)

(72) Inventors: Yuzo Shigesato, Kanagawa (JP); Junjun Jia, Tokyo (JP); Daisuke Fukushi, Kanagawa (JP); Hideaki Hirabayashi, Kanagawa (JP); Yoshinori Kataoka, Kanagawa (JP); Akito Sasaki, Kanagawa (JP); Atsuya Sasaki, Kanagawa (JP)

(73) Assignees: Kabushiki Keisha Toshiba, Tokyo (JP); Toshiba Materials Co., Ltd., Yokohama (JP)

(*) Notice: Subject to any disclaimer, the term of this patent is extended or adjusted under 35 U.S.C. 154(b) by 1303 days.

(21) Appl. No.: 16/660,011

(22) Filed: Oct. 22, 2019

(65) Prior Publication Data
US 2020/0048107 A1    Feb. 13, 2020

Related U.S. Application Data

(63) Continuation of application No. PCT/JP2018/016451, filed on Apr. 23, 2018.

(30) Foreign Application Priority Data

Apr. 27, 2017    (JP) .................. 2017-088761

(51) Int. Cl.
| C01G 23/04 | (2006.01) |
| C01G 1/00 | (2006.01) |

(Continued)

(52) U.S. Cl.
CPC ............. *C01G 55/004* (2013.01); *C01G 1/00* (2013.01); *C01G 1/02* (2013.01); *C01G 1/12* (2013.01);

(Continued)

(58) Field of Classification Search
CPC ........................................ C01G 41/02
See application file for complete search history.

(56) References Cited

U.S. PATENT DOCUMENTS

| 10,283,776 B2 | 5/2019 | Sasaki et al. |
| 2010/0204040 A1 | 8/2010 | Nakano et al. |

(Continued)

FOREIGN PATENT DOCUMENTS

| CN | 101821005 A | 9/2010 |
| CN | 106824190 A * | 6/2017 |

(Continued)

OTHER PUBLICATIONS

Maciej Trawka, et al., "Fluctuation Enhanced Gas Sensing with WO₃-Based Nanoparticle Gas Sensors Modulated by UV Light at Selected Wavelengths," *Sensors and Actuators B-Chemical*, vol. 234 (2016), pp. 453-461.

(Continued)

*Primary Examiner* — Wayne A Langel
(74) *Attorney, Agent, or Firm* — BURR PATENT LAW, PLLC

(57) ABSTRACT

According to one embodiment, nano metal compound particles are provided. The nano metal compound particles have an average particle size of 50 nm or less. The nano metal compound particles have a peak $\omega_t$ of 2.8 eV or less. The peak $\omega_t$ corresponds to a resonant frequency of an oscillator according to a spectroscopic ellipsometry method fitted to a Lorentz model.

14 Claims, 3 Drawing Sheets

(51) Int. Cl.
  *C01G 1/02* (2006.01)
  *C01G 1/12* (2006.01)
  *C01G 39/02* (2006.01)
  *C01G 41/02* (2006.01)
  *C01G 53/04* (2006.01)
  *C01G 55/00* (2006.01)
  *C09D 7/40* (2018.01)
  *B82Y 35/00* (2011.01)
  *B82Y 40/00* (2011.01)

(52) U.S. Cl.
  CPC .............. *C01G 23/04* (2013.01); *C01G 39/02* (2013.01); *C01G 41/02* (2013.01); *C01G 53/04* (2013.01); *C09D 7/67* (2018.01); *B82Y 35/00* (2013.01); *B82Y 40/00* (2013.01); *C01P 2006/16* (2013.01); *C01P 2006/60* (2013.01)

(56) References Cited

U.S. PATENT DOCUMENTS

| | | | |
|---|---|---|---|
| 2010/0292075 A1 | 11/2010 | Nakano et al. | |
| 2011/0003279 A1 | 1/2011 | Patel | |
| 2013/0252084 A1* | 9/2013 | Sasaki | H01M 4/364 429/188 |
| 2014/0287232 A1 | 9/2014 | Tokuno et al. | |

FOREIGN PATENT DOCUMENTS

| | | |
|---|---|---|
| EP | 2 186 560 A1 | 5/2010 |
| EP | 2 248 586 A1 | 11/2010 |
| JP | 2000-143241 A1 | 5/2000 |
| JP | 2005-345338 A1 | 12/2005 |
| JP | 2006-096636 A1 | 4/2006 |
| JP | 2010-228959 A1 | 10/2010 |
| JP | 2011-198606 A1 | 10/2011 |
| JP | 2013-504442 A1 | 2/2013 |
| JP | 2013-058742 A1 | 3/2013 |
| JP | 2014-185039 A1 | 10/2014 |
| TW | 200940168 A | 10/2009 |
| WO | 2014/141694 A1 | 9/2014 |
| WO | 2016/039157 A1 | 3/2016 |
| WO | 2017/034847 A1 | 3/2017 |

OTHER PUBLICATIONS

I. Valyukh, et al., "Spectroscopic Ellipsometry Characterization of Electrochromic Tungsten Oxide and Nickel Oxide Thin Films Made by Sputter Deposition," *Solar Energy Materials & Solar Cells*, vol. 94 (2010), pp. 724-732.

International Search Report and Written Opinion (Application No. PCT/JP2018/016451) dated Jul. 24, 2018.

* cited by examiner $$\varepsilon(\omega) = \varepsilon_\infty + \frac{f\omega_t^2}{\omega_t^2 + \omega^2 + i\gamma_0\varepsilon}$$

$$0 = fa\frac{\varepsilon a - \varepsilon}{\varepsilon a + 2\varepsilon} + fb\frac{\varepsilon b - \varepsilon}{\varepsilon b + 2\varepsilon}$$

NANO METAL COMPOUND PARTICLES, COATING MATERIAL AND FILM USING THE SAME, METHOD FOR PRODUCING FILM, AND METHOD OF PRODUCING NANO METAL COMPOUND PARTICLES

CROSS-REFERENCE TO RELATED APPLICATION

This application is a Continuation Application of PCT Application No. PCT/JP2018/016451, filed Apr. 23, 2018 and based upon and claiming the benefit of priority from Japanese Patent Application No. 2017-088761, filed Apr. 27, 2017, the entire contents of all of which are incorporated herein by reference.

FIELD

Embodiments relate to nano metal compound particles, a coating material and a film using the same, a method of producing the film, and a method for producing the nano metal compound particles.

BACKGROUND

Metal compounds, such as metal oxides, are used in various fields, such as semiconductor materials, electrode materials for batteries, photocatalytic materials, and electrochromic materials.

For example, International Publication No. 2016/039157 (Patent Document 1) discloses a metal oxide powder provided with oxygen deficiency. In Patent Document 1, hopping conduction is provided by controlling the oxygen deficiency amount. Patent Document 1 uses such a metal oxide powder for battery electrode materials to improve the capacitance and the cycle retention rate. Indeed, the performance of batteries can be improved by using the metal oxide powder of Patent Document 1.

In the meantime, further improvements in the performance of metal oxide powders are in demand. As one method, micronization is considered. Patent Document 1 discloses a tungsten oxide powder having an average particle size of 25 nm. The surface area thereof can be increased by further reducing the average particle size. As for electrode materials for batteries and the like, the dimension for inserting and extracting lithium ions can be increased by enlarging the surface area thereof. For photocatalysts, as well, dimensions for performing photocatalytic reactions can be enlarged.

It has been difficult to stably formulate properties of metal oxide particles, when the particles were adjusted to be several tens of nm or less. In addition, in Patent Document 1, an electrode layer had to be formed to measure the active energy Ea of the tungsten oxide powder.

DETAILED DESCRIPTION

Figures 1, 2, 3:
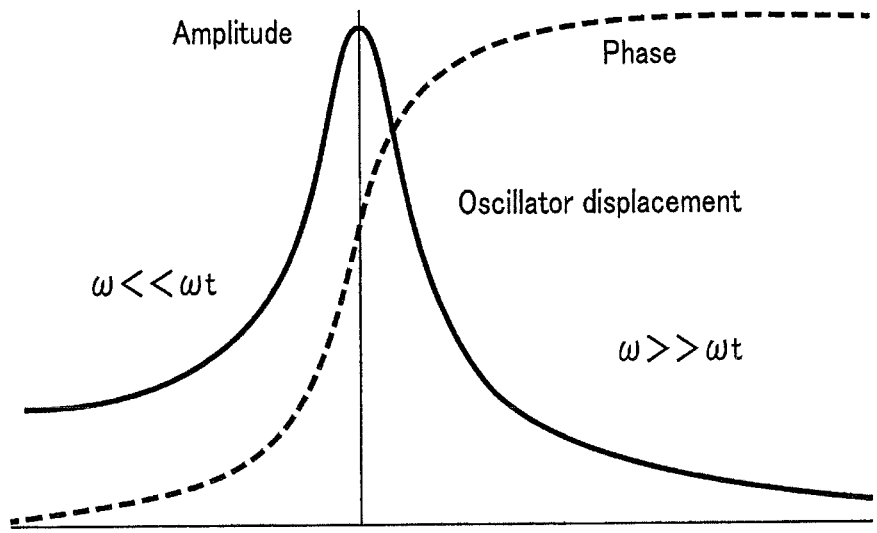
FIG. 1 is a conceptual diagram showing an example of a Lorenz model.
FIG. 2 is a theoretical equation for performing fitting to the Lorenz model.
FIG. 3 is the Braggman equation.

In Patent Document 1, the metal compound particles of several tens of nm in size are produced using a sublimation procedure of a raw material powder and an oxidization procedure of the raw material powder. The resulting metal compound particles are sometimes subjected to heat treatment in subsequent procedures. Since the metal compound particles are produced through a number of procedures, it had not been possible to satisfactorily distinguish between good products and defective products, even if variation was present between different lots. In particular, in Patent Document 1, an electrode layer has to be formed in order to measure the active energy Eα, and variation between different lots cannot be sufficiently ascertained.

Embodiments according to the present invention have been made to solve the problems described above and provide nano metal compound particles exhibiting excellent performance, even when formed into microparticles having an average particle size of 50 nm or less. Moreover, according to the embodiments, a coating material and a film are provided. Furthermore, according to the embodiment, a method for producing a film (e.g., a thin film) and a method for producing nano metal compound particles are provided.

Nano metal compound particles according to an embodiment have a feature where, when results obtained by analyzing metal compound particles having an average particle size of 50 nm or less by a spectroscopic ellipsometry method are fitted to a Lorentz model, a peak $\omega_t$ of a resonant frequency of an oscillator is 2.8 eV or less.

A coating material according to an embodiment includes the above nano metal compound particles.

A film according to an embodiment includes the above nano metal compound particles.

A method for producing a film according to an embodiment includes, forming a nano metal compound particle-containing paste film by applying a paste containing the above nano metal compound particles, and drying the nano metal compound particle-containing paste film.

A production method for nano metal compound particles according to an embodiment is a method for producing the above nano metal compound particles. The production method includes, analyzing nano metal compound particles by a spectroscopic ellipsometry method then fitting analysis results thereof to the Lorentz model, and selecting nano metal compound particles having peak $\omega_t$ of a resonant frequency of an oscillator of 2.8 eV or less and an average particle size of 50 nm or less.

Nano metal compound particles according to an embodiment have a feature in that when metal compound particles having an average particle size of 50 nm or less are analyzed by a spectroscopic ellipsometry method and the results thereof are fitted to a Lorentz model, a peak $\omega_t$ of a resonant frequency of the oscillator is 2.8 eV or less.

First, the average particle size of the nano metal compound particles is 50 nm or less. The average particle size is determined by converting a BET specific surface area into an average particle size, assuming that each particle is a true sphere. The average particle size is 50 nm or less, and more preferably 15 nm or less. The surface area of a nano metal compound particle can be increased as the average particle size becomes small. The lower limit value of the average particle size is not particularly constrained; however, the average particle size is preferably 2 nm or more. When the average particle size is less than 2 nm, the productivity degrades. For this reason, the average particle size is preferably from 2 nm to 50 nm, and more preferably from 4 nm to 15 nm.

Moreover, the particle size of nano metal compound particles is preferably 100 nm or less. Even if the average particle size is small, when coarse particles are included in the nano metal compound particles, the effect of increasing the surface area cannot be obtained for the portion of the coarse particles. In such a case, variation in packing density arises when the particles are formed into a film. The variation in packing density may lead to variation in the performance among portions. Therefore, the particle size is preferably 100 nm or less. In the measurement of the particle size, an enlarged photograph is used, and the maximum diameter of nano metal compound particles appearing in the photographed image is regarded as a particle size. This procedure is repeated for 100 particles, and the largest particle diameter is determined as the particle size. The measurements of particles are performed by taking such enlarged photographs using a transmission electron microscope (TEM) or a scanning electron microscope (SEM).

Furthermore, results from analyzing the metal compound particles by a spectroscopic ellipsometry method are fitted to a Lorentz model.

In the spectroscopic ellipsometry method, linear polarization light is introduced as incidence on a sample, and a polarization state of light reflected by the sample is examined. In the embodiments, elliptically polarized light is used. In order to perform fitting of the properties of the sample, a Lorentz model is used. The Lorentz model is based on a classical theory of the interaction between light and a substance, and indicates a polarization state that depends on the frequency generated by bound electrons. Electrons react with an electromagnetic field of light and oscillate like a damped harmonic oscillator. The spectroscopic ellipsometry method utilizes this phenomenon. Light in a visible light region or an infrared region is used for performing the spectroscopic ellipsometry method. Use of such a light is particularly effective when the metal compound is a substance that absorbs light in the visible light region or the infrared region. The visible light region is designated as a region ranging from 380 nm to 750 nm. The infrared region is designated as a region ranging from about 0.75 μm to 1000 μm. It should be noted that the infrared region includes the near-infrared region, the mid-infrared region, and the far-infrared region.

FIG. 1 is a conceptual diagram showing an example of a Lorenz model. In the conceptual diagram, the solid line indicates oscillator displacement, and the dashed line indicates phase. The peak height in the solid line indicating the oscillator displacement corresponds to the oscillator strength (Amplitude). FIG. 2 is a theoretical equation for the performing of fitting to the Lorenz model. In the theoretical equation, ω denotes a frequency of incident light; $\omega_t$ denotes the oscillator center of the oscillator; $\gamma_0$ denotes a damping factor; f denotes oscillator strength (amplitude); $\varepsilon(\omega)$ denotes a permittivity function, $\varepsilon^\infty$ denotes a limit value of high-frequency permittivity function, and i is an imaginary number.

When the measured results are fitted to the Lorentz model, the oscillator center (resonant frequency) $\omega_t$ of the oscillator as shown in FIG. 1 appears. "$\omega_t$" is the center of the oscillator center and represents a peak position.

Also, using the Braggman equation shown in FIG. 3, the permittivity of the metal compound particles is calculated. It should be noted that "Braggman" is sometimes denoted as "Bruggeman".

The Braggman equation is an analysis model in which the sample is regarded as a homogenous film in which a substance a and a substance b are mixed. Such an analysis model is referred to as an "effective medium approximation (EMA)" model. In FIG. 3, $f_a$ denotes a volume ratio of the substance a, $\varepsilon_a$ denotes a permittivity of the substance a, $\varepsilon$ denotes a permittivity of the entire film, $f_b$ denotes a volume ratio of the substance b, and $\varepsilon_b$ denotes a permittivity of the substance b.

In the measurements, metal compound particles are deposited on a glass substrate. The deposition amount is 50 nm to 200 nm in film thickness. In the Braggman equation, the substance a denotes nano metal compound particles, and the substance b denotes air. The nano metal compound particles are measured in the form of a deposited film where the particles in a predetermined amount are deposited. There is no need to use a sputtered film or a mixed film between nano metal compound particles and a resin. Since only nano metal compound particles are singularly deposited, a film is obtained which takes the particle shape into account. The incident angle of light is preferably 45°. When metal compound particles contained in a film product are measured, the film product itself may be measured directly.

In the embodiments, the measurement results obtained by using the spectroscopic ellipsometry method are applied to the Braggman equation to determine the permittivity $\varepsilon_a$ of the nano metal compound particles. The permittivity $\varepsilon_a$ is applied to the fitting using the Lorentz model. Thereby, the chemical state, carrier density, interfacial state, etc. of the nano metal compound particles can be evaluated.

For the nano metal compound particles according to the embodiment, the peak $\omega_t$ of the oscillator center (resonant frequency) of the oscillator is 2.80 eV or less. As described above, the spectroscopic ellipsometry method is used to evaluate the chemical state, carrier density, and states of interfaces for the nano metal compound particles. In other words, $\omega_t$ is affected by the chemical state, carrier density, and interfacial states of the nano metal compound particles. These states are affected by various factors, such as the composition, crystal structure, particle size, surface roughness, band gap, and anisotropy, of the nano metal compound particles.

The peak $\omega_t$ being 2.80 eV or less indicates that the composition, crystal structure, particle size, surface roughness, band gap, anisotropy and the like of the nano metal compound particle are homogenous as a batch. This allows for an improvement in efficiency of taking electrons out from or taking electrons into the nano metal compound particles. That is, this allows for an improvement in performance of the nano metal compound particles as a semiconductor. The transfer of electrons brought about by flowing electricity or irradiation with light becomes active. For this reason, the performance of the nano metal compound particles as a semiconductor is improved. Applications of the nano metal compound particles include materials suitable for various fields, such as battery electrodes, photocatalysts, sensors, and electrochromic devices.

It is preferable that $\omega_t$ is within the range of 0.5 eV≤$\omega_t$≤2.00 eV. Electricity flows more easily when $\omega_t$ is lower. On the contrary, when $\omega_t$ is less than 0.5, the ease of electricity flow may become too excessive. When the electricity can easily flow through a material, the material would be closer to being a metal rather than a semiconductor.

Also, the metal compound particles preferably are particles including any one of, or two or more of a metal oxide, a metal sulfide, a metal nitride, and a metal carbide. The metal compound is preferably one of, or two or more of a metal oxide, a metal sulfide, a metal nitride, and a metal carbide.

An example of the metal oxide include one selected from the group consisting of tungsten oxide ($WO_{3-x}$, $0 \leq x < 3$), molybdenum oxide ($MoO_{3-x}$, $0 \leq x < 3$), indium oxide ($IrO_{2-x}$, $0 \leq x < 2$), nickel oxide ($NiO_{1-x}$, $0 \leq x < 1$), and titanium oxide ($TiO_{2-x}$, $0 \leq x < 2$). The metal oxide may also be a composite oxide of these oxides.

Examples of the metal oxide also include indium tin oxide (ITO), antimony tin oxide (ATO), aluminum zinc oxide (AZO), and gallium-added zinc oxide (GZO). These composite oxides are materials used as transparent electrodes.

An example of the metal sulfide includes molybdenum sulfide ($MoS_2$). An example of the metal carbide includes tungsten carbide (WC).

Also, the nano metal compound particles preferably exhibit intercalation. Intercalation means a reversible reaction where electrons or ions are inserted into or extracted out from nano metal compound particles. The performance of nano metal compound particles as a semiconductor is improved by actively performing an intercalation reaction. Namely, the transfer of electrons brought about by flowing electricity or irradiation with light becomes active. For this reason, the nano metal compound particles become a material suitable for various fields, such as electrodes for batteries, photocatalysts, sensors, and electrochromic devices.

Furthermore, the metal compound particles preferably have deficiency. By providing deficiency to the metal compound particles, the capacity of the intercalation reaction can be increased. The deficiency is also referred to as "lattice defects". If metal compound particles have, in their crystal, a structure that does not conform to a repeated pattern, deficiency is present. The deficiency is roughly classified into deficiency due to disturbance in an array of atomic arrangement, and deficiency due to impurities. The disturbance in an array of atomic arrangement indicates a state where there is a lack in atoms constituting crystal lattices. The deficiency due to impurities indicates a state where impurities intrude between atoms of crystal lattices, or where a part of the atoms is substituted by impurities.

It is preferable that the metal compound particles be particles containing a metal oxide or the metal compound be a metal oxide, and the metal oxide have oxygen deficiency for either case. The oxygen deficiency can be formed by subjecting a metal oxide to heat treatment in a reducing atmosphere or an inert atmosphere. Use of a metal oxide renders it easy to produce nanoparticles by plasma processing as described later. Use of a metal sulfide, metal carbide or metal nitride makes the procedure of providing deficiency complicated.

The metal oxide is preferably one, or two or more selected from the group consisting of a tungsten oxide ($WO_{3-x}$, $0 \leq x < 3$), a molybdenum oxide ($MoO_{3-x}$, $0 \leq x < 3$), an iridium oxide ($IrO_{2-x}$, $0 \leq x < 2$), a nickel oxide ($NiO_{1-x}$, $0 \leq x < 1$), and a titanium oxide ($TiO_{2-x}$, $0 \leq x < 2$). It should be noted that for metal oxides having oxygen deficiency, x in the respective composition formulae is larger than zero ($x>0$). For tungsten oxide ($WO_{3-x}$), x is preferably in the range of $0.08 \leq x \leq 0.3$. For molybdenum oxide ($MoO_{3-x}$), x is preferably in the range of $0.15 \leq x \leq 0.30$. For iridium oxide ($IrO_{2-x}$), x is preferably in the range of $0.1 \leq x \leq 0.3$. For nickel oxide ($NiO_{1-x}$), x is preferably in the range of $0.1 \leq x \leq 0.3$. For titanium oxide ($TiO_{2-x}$), x is preferably in the range of $0.01 \leq x \leq 0.10$. When the x value is small, the effect of providing oxygen deficiency is liable to be insufficient. When the x value is large, the oxygen deficiency becomes excessively large, and the metal oxide becomes excessively close to an electrical conductor. If the metal oxide becomes excessively close to an electrical conductor, the performance thereof as a semiconductor degrades. For use where electricity is directly made to flow, as in electrodes for batteries, sensors, and electrochromic devices, it is effective to provide oxygen deficiency. In contrast, for use where electricity is not applied, as in photocatalysts, it is unnecessary to provide any oxygen deficiency.

With tungsten oxides, molybdenum oxides, iridium oxides, nickel oxides, and titanium oxides, nanoparticles can be easily produced through plasma processing. Furthermore, oxygen deficiency can be easily provided to these materials, too.

The nano metal compound particles as described above may be used for a film (e.g., thin film) containing nano metal compound particles. In addition, the nano metal compound particles may be used in a coating material for forming such a film, i.e., a coating material containing nano metal compound particles.

The thin film preferably contains the nano metal compound particles according to the embodiment in an amount of 50% by volume to 100% by volume. When the amount of the nano metal compound particles is less than 50% by volume, the effect may become insufficient due to the excessively small content of the nano metal compound particles according to the embodiment. When the thin film requires vacancies, the content of the nano metal compound particles is preferably 90% by volume or less. This indicates a thin film where 10% by volume or more of vacancies are present.

In addition, the thin film preferably has a thickness of 1 µm or less. When the film thickness is excessively large, the step for depositing nano particles may become complicated. In addition, the effect of using the nano metal compound particles according to the embodiment may not be sufficiently obtained. For example, in photocatalysts, the effect is obtained by using an active reaction of surfaces of nano metal compound particles. In the active reaction, a gas to be decomposed is brought into contact with a thin film (a thin film containing nano metal compound particles) and a photocatalytic reaction is undergone. If the film thickness is excessively large, light (light that promotes the photocatalytic reaction) or a reaction substrate (the gas to be decomposed) may not sufficiently reach nano metal compound particles near the substrate plane. Therefore, the thickness of the thin film is preferably 1 µm or less. The lower limit of the film thickness is not particularly constrained; however, it is preferably 10 nm or more. This is because when the film thickness is excessively small, resultant effect may be insufficient. Therefore, the film thickness is preferably 10 nm to 1 µm, and more preferably 20 nm to 200 nm.

A film akin to the above-mentioned thin film preferably has a peak $\omega_t$ of a resonant frequency of an oscillator of 2.8 eV or less, when analysis results obtained by the spectroscopic ellipsometry method are fitted to the Lorentz model. When the peak $\omega_t$ is 2.8 eV or less, this shows that the nano metal compound particles contained in the film are homogenous in terms of the composition, crystal structure, particle size, surface roughness, band gap, anisotropy and the like. That is, such a film exhibits favorable performance as a semiconductor.

The procedure for forming the thin film preferably includes a procedure of applying a paste containing nano metal compound particles (e.g., a coating material containing nano metal compound particles) to form a nano metal compound particle paste film, and a procedure of drying the nano metal compound particle paste film.

To make the high performance of the nano metal compound particles according to the embodiment be appreciable, it is preferable to avoid subjecting the thin film to high temperature, as far as possible. For example, a thermal spraying method is a film formation method in which a raw material powder is heated (or melted) and then sprayed onto a target. Since the raw material powder is heated, physical properties of the raw material powder may change. A sputtering method involves forming a film by applying an electron beam to a sputtering target. In the case of a single metal, the sputtering method is a film formation method that allows for relatively easy control of physical properties of a film. In contrast, in the case of a metal compound, physical properties of a film is difficult to control using the sputtering method. In addition, this method requires specific conditions such as a vacuum atmosphere, which consequently lead to high costs.

In contrast, the method for producing a thin film according to the embodiment is a method using a paste of nano metal compound particles. In the method, a film is formed via a wet process using a paste. Therefore, the method enables formation of a thin film without degrading the physical properties of the nano metal compound particles.

As a solvent used in preparing the paste, it is preferable to use a solvent that evaporates at 300° C. or lower. When a paste containing nano-metal compound particles is prepared, other materials may be added as necessary. Examples of the other materials include a plasticizer and a dispersant.

In this manner, the coating material containing nano metal compound particles may contain a solvent. When a solvent is used to prepare a paste, it is possible to obtain a coating material suitable for film formation via a wet process. The coating material may contain other materials, such as a plasticizer and a dispersant.

First, the procedure of applying a paste containing nano metal compound particles onto a substrate is performed. The substrate is the location where the thin film is to be provided. The material, shape, and the like of the substrate are not limited; however, a specific example of the substrate is a glass substrate. When the paste is applied thereto, the thickness of the thin film is adjusted to 1 μm or less. The above constitutes the procedure of forming a nano metal compound particle paste film.

Next, the procedure of drying the nano metal compound particle paste film is performed. The drying procedure is performed at a temperature where the solvent of the paste evaporates. In addition, the drying procedure is preferably performed at a temperature of 400° C. or lower. If the temperature used in the drying procedure is higher than 400° C., the physical properties of the nano metal compound particles may change. For this reason, the drying procedure is preferably performed at 400° C. or lower, and more preferably 200° C. or lower.

Whether or not there has been formed a film having homogenous nano metal compound particles can be examined by fitting, to the Lorentz model, results obtained by analyzing the obtained film via the spectroscopic ellipsometry method, in the same manner as that explained above for the nano metal compound particles. The formed film can be directly measured. If the peak $\omega_t$ of the resonant frequency of the oscillator determined by the fitting is 2.8 eV or less, it can be determined that the nano metal compound particles are homogenous in terms of the composition, crystal structure, particle size, surface roughness, band gap, anisotropy and the like. The peak $\omega_t$ exceeding 2.8 eV may mean that a film containing homogenous metal compound particles had not been obtained due to some factor during the film formation. As for the film, the peak $\omega_t$ preferably satisfies 0.5 eV≤$\omega_t$≤2.00 eV.

Also, the particle size of the nano metal compound particles in the film can be examined by using TEM or SEM, similarly to the manner as explained above for the nano metal compound particles.

The thus obtained thin film is preferably used for one selected from the group consisting of a semiconductor, a battery electrode, a photocatalyst, a sensor, and an electrochromic device.

The semiconductors, battery electrodes or sensors are fields where the intercalation performance of electrons or ions of nano metal compound particles can be appreciated. By using the thin film, for example, as electrodes for Li ion secondary batteries or capacitors, the energy density and power density thereof can be improved.

In sensors, it is possible to utilize the capability of activation of surfaces of nano metal compound particles. An example of the sensors includes a gas sensor. For example, a sensor including nano metal compound particles is placed in a methane gas ($CH_4$)-containing atmosphere. The electric resistance value varies in accordance with the amount of methane gas adsorbed onto the nano metal compound particles. By utilizing this property, it is possible to make the thin film including nano metal compound particles into a methane gas sensor. In order to activate the nano metal compound particles, it is also effective to irradiate the thin film with light having an excitation wavelength, such as an ultraviolet ray, as necessary. The sensor is not limited to one for sensing methane gas, and the thin film can be used as a sensor for any substance that becomes adsorbed onto surfaces of nano metal compound particles. For example, a hydrocarbon gas, such as ethane, is exemplified. The film can also be used for alcohol sensors, odor sensors, toxic gas sensors, etc.

In photocatalysts, surfaces of nano metal compound particles can be activated. Therefore, photocatalytic performance can be improved. With improved photocatalytic performance, enhanced performance can be achieved while using the same amount of particles.

Furthermore, by designing the photocatalyst to have the same photocatalytic performance, it is possible to reduce the amount of particles.

Electrochromic devices are devices where a reversible reaction takes place in optical properties by providing an electric charge. Electrochromic devices are used in display devices for, for example, electronic publications, displays and the like. The film of nano metal compound particles is excellent in reversible reactivity of optical properties, and thus enable high-speed monochrome inversion (switching of a display). In addition, by providing oxygen deficiency, it is also possible to provide monochrome inversion at low resistance.

As one electrochromic device, a proton intercalation device is exemplified. A proton intercalation device has a function where nano metal compound particles are reacted with cations or anions to perform charging or coloring. An attempt is made to apply proton intercalation devices to window glasses by utilizing this property. When a window glass is provided with a thin film and a voltage is applied thereto, the thin film absorbs visible light or infrared rays and becomes colored, thereby making it possible to shield the visible light or infrared rays. Window glasses are used in various places, such as vehicles, airplanes, and buildings. For example, if an automobile is left standing in daylight, the temperature inside becomes high. The same applies to buildings, and recently, heatstroke has become a social issue. The nano metal compound particles (tungsten oxide particles, etc.) according to the embodiments have a capability of absorbing both visible light and infrared rays. When a thin film containing nano metal compound particles, such as tungsten oxide particles, is used in a proton intercalation device, the thin film can absorb visible light and infrared rays. In addition, by providing oxygen deficiency, it is possible to induce a reversible reaction at low resistance. With this, it is possible to provide a thin film capable of shielding light at low resistance.

Moreover, a proton intercalation device containing the nano metal compound particles according to the embodiment allows radio waves to pass through while shielding visible light and infrared rays. Therefore, even if the proton intercalation device is used for window glasses of vehicles, airplanes, and buildings, it has no adverse effect on radio wave communications (mobile phones, etc.).

Next, the method for producing nano metal compound particles according to the embodiment will be described. The method for producing nano metal compound particles is not particularly limited, so long as the obtained nano metal compound particles have the above-mentioned features; however, as a method for obtaining the nano metal compound particles at a high yield, the following methods are exemplified.

First, in order to produce metal compound particles having an average particle size of 50 nm or less, a method of using a sublimation procedure and a method of using a solution phase synthesis are exemplified. The sublimation procedure is preferably any one of plasma processing, arc processing, laser processing, and electron beam processing. Of these, plasma processing is preferred. Furthermore, for the plasma processing, inductively-coupled plasma processing is preferred. The inductively-coupled plasma processing is a method of using plasma flame. In addition, if an oxygen-containing atmosphere is used in the sublimation procedure, a metal oxide can be produced. If a nitrogen-containing atmosphere is used, a nitride can be produced, and if a sulfur-containing atmosphere is used, a sulfide can be produced.

In the liquid phase synthesis, a precursor of a metal compound is dissolved in a solution, and the pH or temperature of the solution is changed to precipitate the metal compound, thereby preparing metal compound particles. For example, a tungsten acid is dissolved in an aqueous solution whose pH has been adjusted to 8 or higher by using ammonia. The pH of the aqueous solution is adjusted to 4 or lower by using hydrochloric acid or nitric acid to thereby precipitate an amorphous tungsten oxide. The precipitate is extracted through filtration and dried, then subsequently fired in air at 300° C. to 450° C., whereby crystalline tungsten oxide nano particles can be obtained.

In the method of using a sublimation procedure or liquid phase synthesis, it is possible to produce nano metal compound particles in an approximate amount of 1 kg to 5 kg per batch, in single metal conversion.

In addition, when oxygen deficiency is provided to metal compound particles, a method is exemplified in which resulting metal oxide particles are subjected to heat treatment in an inert atmosphere or a reducing atmosphere. As for the procedure of providing oxygen deficiency, Patent Document 1 is used as reference.

The resulting metal compound particles need to be classified to adjust the average particle size and the maximum value of particle sizes. Through the above described procedure, nano metal compound particles having an average particle size of 50 nm or less are produced.

Next, the obtained nano metal compound particles are sampled from each lot so that the thickness thereof is 50 nm to 200 nm when the particles are deposited. The value $\omega_t$ is measured for each lot by a spectroscopic ellipsometry method. Samples having a peak $\omega_t$ of 2.80 eV or less are taken as good products and used for forming thin films. The criteria of good products regarding $\omega_t$ may be changed in accordance with each material used, or with each application. For example, when nano metal compound particles are used as an electrode material for batteries, a value $\omega_t$ of 2.00 eV or less can be set as the criteria for samples that are good products.

As another method, the following method is exemplified.

First, metal compound particles of small diameter are produced by a sublimation procedure. A procedure of providing a graphite layer on surfaces of the resulting metal compound particles is performed. The procedure of providing a graphite layer is a heat treatment procedure which involves coating surfaces of the metal compound particles with an organic compound, which becomes graphite through heat treatment. Examples of the organic compound which becomes graphite through heat treatment include ethyl cellulose, methyl cellulose, hydroxymethyl cellulose, polyethylene glycol, and glycol. A graphite layer is formed by firing the metal compound particles provided with an organic compound coating in an inert gas, such as nitrogen, argon or the like, at a low temperature of 350° C. to 500° C. for 30 min or more. Next, the nano metal compound particles can be highly crystalized by subjecting them to high-temperature firing from 600° C. to 800° C. in an inert gas for 5 min or more. When the nano metal compound particles are highly crystalized, their homogeneity is improved, making the value $\omega_t$ become 2.80 eV or less. In addition, by performing firing in a reducing gas instead of the inert gas, it is possible to introduce deficiency into the metal compound particles in the graphite and vary the value of $\omega_t$. Subsequently, by performing a procedure of removing the graphite layer, nano metal compound particles can be produced. For the procedure of removing the graphite layer, a method is exemplified in which the metal compound particles are subjected to heat treatment at 400° C. to 500° C. in air. The resulting particles are subjected to classification as necessary. The procedure of providing a graphite layer is intended for metal compound particles of an approximate amount of 1 kg to 5 kg (in single metal conversion) per batch.

Regardless of which production method had been used, measurements via the spectroscopic ellipsometry method is preferably performed for each lot of obtained nano metal compound particles to examine a value cot. That is, the method for producing nano metal compound particles desirably includes a procedure of analyzing (a batch of) nano metal compound particles by the spectroscopic ellipsometry method and fitting the analysis results into the Lorentz model. Through this procedure, it is possible to examine whether the peak $\omega_t$ of a resonant frequency of an oscillator is 2.8 eV or less. The production method desirably further includes a procedure of selecting nano metal compound particles having a peak $\omega_t$ of the resonant frequency of the oscillator of 2.8 eV or less, and an average particle size of 50 nm or less. This production method allows for lots of good products to be distinguished from defective products and enables preparation of (a batch of) nano metal compound particles as good products. In other words, the spectroscopic ellipsometry method can be used as an evaluation method of nano metal compound particles per se, as well as an evaluation method of a film using the nano metal compound particles.

EXAMPLES

Examples 1 to 11 and Comparative Examples 1 and 2

Metal oxide powders were produced using inductively-coupled plasma processing. Metal oxide powders to be provided with oxygen deficiency (0<x) were subjected to heat treatment in nitrogen. Through this procedure, metal oxide powders according to Examples 1 to 9 and Comparative Examples 1 and 2 were prepared.

Additionally, metal oxide powders were produced using inductively-coupled plasma processing. Graphite layers were formed on the metal oxide powders, followed by subjecting the metal oxide powders to high crystallization treatment in which the powders were fired at 700° C. for 10 min. Furthermore, the graphite layers were removed by heat treatment in air. Through the procedure described above, metal oxide powders according to Examples 10 and 11 were produced.

The average particle sizes, maximum values of particle size, and the values $\omega_t$ of the metal oxide particles according to the Examples and Comparative Examples are as shown in Table 1.

The average particle size is a value calculated from a BET specific surface area in true sphere conversion. The maximum value of particle size was obtained by examining the maximum values of 100 particles using TEM or SEM. The largest diameter among the maximum values thereof was designated as a maximum value of particle size.

The value $\omega_t$ was measured by the spectroscopic ellipsometry method after setting a sample having a deposited film of a thickness of 100 nm. In the measurement, the incident angle was set to 45°. Fitting of the obtained results was performed using the Braggman equation and the Lorentz model.

The results are shown in Table 1.

TABLE 1

| | Material | Average particle size (nm) | Maximum value of particle size (nm) | $\omega_t$ (eV) |
|---|---|---|---|---|
| Example 1 | $WO_{2.83}$ | 9 | 35 | 1.50 |
| Example 2 | $WO_3$ | 30 | 80 | 1.17 |
| Example 3 | $WO_{2.72}$ | 15 | 68 | 0.82 |
| Example 4 | $MoO_{2.82}$ | 12 | 60 | 1.86 |
| Example 5 | $MoO_{2.74}$ | 16 | 74 | 1.62 |
| Example 6 | $IrO_{1.85}$ | 14 | 58 | 1.92 |
| Example 7 | ITO | 28 | 92 | 2.20 |
| Example 8 | $TiO_{1.92}$ | 13 | 65 | 1.81 |
| Example 9 | $TiO_{1.99}$ | 14 | 72 | 1.63 |
| Example 10 | $WO_{2.82}$ | 10 | 21 | 1.48 |
| Example 11 | $MoO_{2.82}$ | 11 | 25 | 1.88 |
| Comparative Example 1 | $WO_{2.98}$ | 50 | 180 | 3.05 |
| Comparative Example 2 | $WO_3$ | 200 | 520 | 1.83 |

Figure 4:
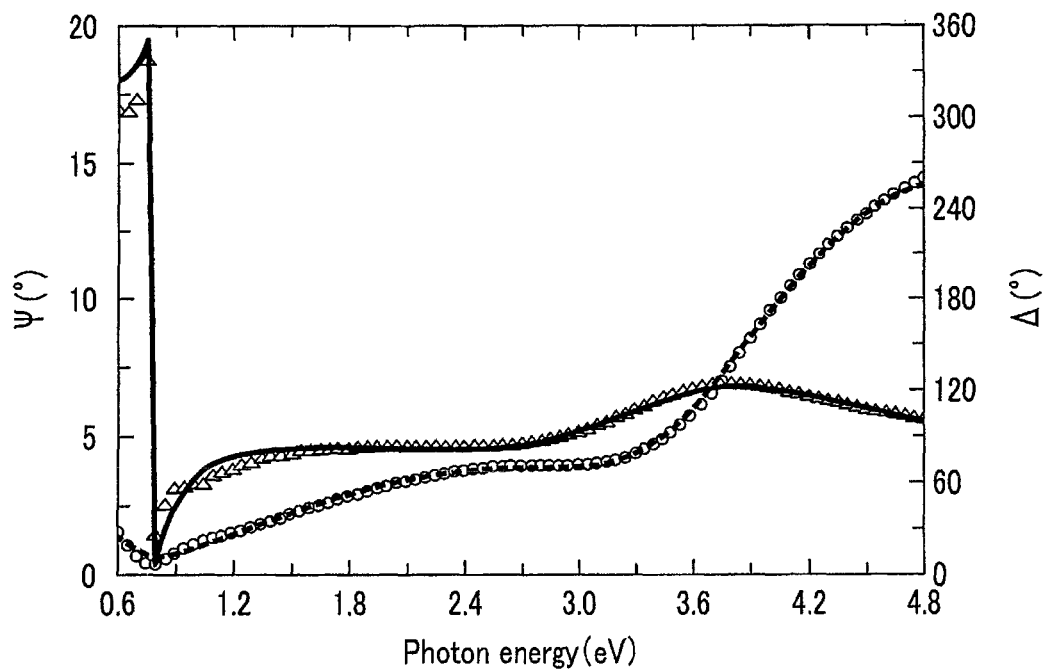
FIG. 4 is a graph between the ellipsometry angle and photon energy in Example 1.
Figure 5:
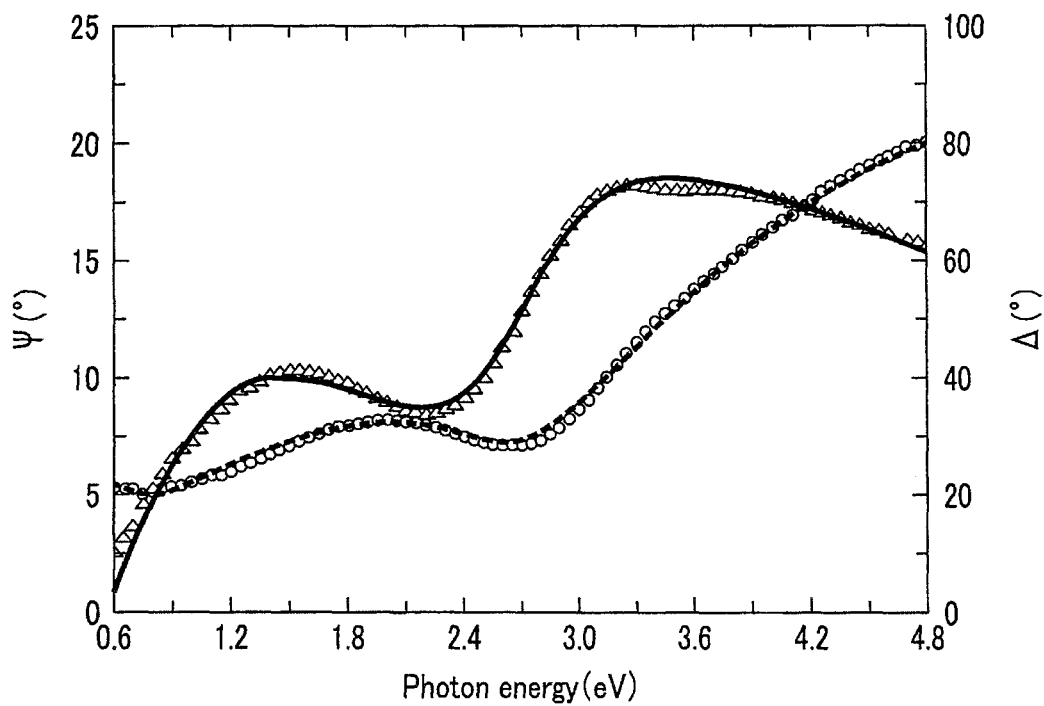
FIG. 5 is a graph between the ellipsometry angle and photon energy in Example 2.

Comparative Example 1 is a metal oxide powder whose $\omega_t$ had exceeded 2.80 eV, and Comparative Example 2 is a metal oxide powder having large particle size. Example 1 ($WO_3$) and Example 7 (ITO) are metal oxide powders provided with no oxygen deficiency. FIG. 4 shows an Ellipsometric Angle—Photon Energy graph for Example 1. FIG. 5 shows an Ellipsometric Angle—Photon Energy graph for Example 2. In the figure, "○" (circle) plots indicate ellipsometric angles ($\Psi(°)$), and "△" (triangle) plots indicate phase differences ($\Delta(°)$).

Example 2A and Comparative Examples 1A and 2A

Next, tungsten oxide powders ($WO_{3-x}$) of Example 2 and Comparative Examples 1 and 2 were used to examine the photocatalytic performance thereof.

Each of the tungsten oxide particles was formed into a paste, and the paste was applied onto a glass substrate, thereby forming a thin film having a thickness of 100 nm. The vacancy rate of the thin films were unified to 30%. The film thickness was set to 800 nm for Comparative Example 2. As for photocatalytic performance, an acetaldehyde-containing atmosphere was introduced into each of the thin films, and a reduction ratio of the photocatalytic performance after five hours was measured under the conditions whereby each of the thin films was irradiated with light of a fluorescent lamp from the glass substrate side thereof (back surface side relative to the thin film). The results are shown in Table 2.

TABLE 2

| | Nano metal compound particles | Thickness of thin film (nm) | Photocatalytic performance: Reduction ratio of acetaldehyde (%) |
|---|---|---|---|
| Example 2A | Example 2 | 300 | 100 |
| Comparative Example 1A | Comparative Example 1 | 300 | 28 |
| Comparative Example 2A | Comparative Example 2 | 800 | 34 |

As is clear from the Table 2, the thin film according to the Example was found to have improved photocatalytic performance. In contrast, the thin films according to the Comparative Examples were found to have decreased photocatalytic performance. The powders having a peak value $\omega_t$ within a predetermined range exhibited excellent performance.

Examples 1B to 12B and Comparative Examples 1B and 2B

Figure 6:
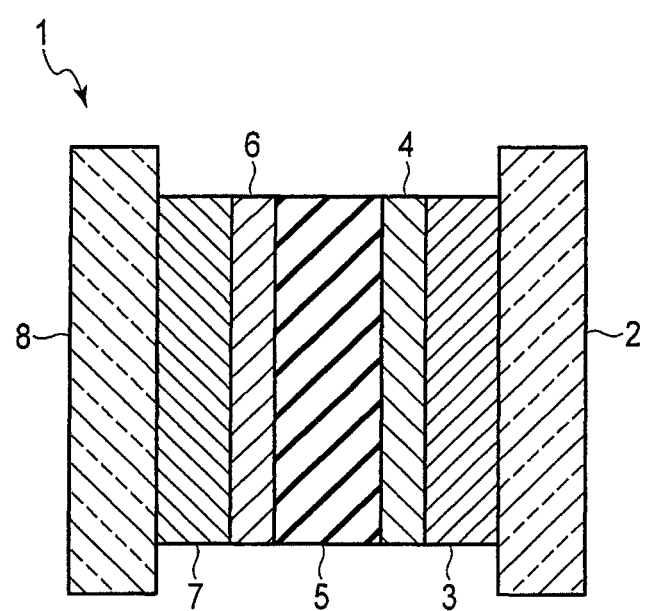
FIG. 6 is a cross-sectional diagram showing a cell structure of a proton intercalation device.

Proton intercalation devices were produced using the metal compound particles according to Examples and Comparative Examples. As the proton intercalation devices, those having a cell structure shown in FIG. 6 were used. In FIG. 6, 1 denotes a proton intercalation device; 2 denotes a glass substrate; 3 denotes an Al electrode; 4 denotes a counter electrode; 5 denotes an electrolyte; 6 denotes a thin film; 7 denotes an Al electrode; and 8 denotes a glass substrate. For the counter electrode 4, a stacked deposition film of $IrO_2/SnO_2$ was used, and for the electrolyte, a $Ta_2O_5$ deposition film was used. For the thin film 6, thin films according to Examples and Comparative Examples were used.

Thicknesses of thin films containing the metal compound particles in the devices according to Examples were unified to 80 nm. The film thickness for Comparative Example 1B was adjusted to 150 nm, and the film thickness for Comparative Example B2 was adjusted to 1.5 μm.

For Example 12, formed was a film containing 90% by volume of Example 3 and 10% by volume of Comparative Example 2.

The responsiveness of each of the proton intercalation devices was examined. To examine the responsiveness, a voltage was applied between the Al electrode 3 and the Al electrode 7 to determine a change in color and response speed. As for the change in color, a proton intercalation device able to shield visible light by coloring via the application of a voltage was evaluated as "True", and a proton intercalation device that was unable to shield visible light was evaluated as "False". As for the response speed, the time required for Comparative Example 2B to become colored until able to shield visible light was taken as 1.0, and the time required for each Example is shown by ratio. The results are shown in Table 3.

TABLE 3

|  | Nano metal compound particles | Color change | Response speed |
|---|---|---|---|
| Example 1B | Example 1 | True | 0.4 |
| Example 2B | Example 2 | True | 0.8 |
| Example 3B | Example 3 | True | 0.7 |
| Example 4B | Example 4 | True | 0.5 |
| Example 5B | Example 5 | True | 0.7 |
| Example 6B | Example 6 | True | 0.7 |
| Example 7B | Example 7 | True | 0.9 |
| Example 8B | Example 8 | True | 0.7 |
| Example 9B | Example 9 | True | 0.8 |
| Example 10B | Example 10 | True | 0.3 |
| Example 11B | Example 11 | True | 0.4 |
| Example 12B | Example 3 + Comparative Example 2 | True | 0.8 |
| Comparative Example 1B | Comparative Example 1 | False | — |
| Comparative Example 2B | Comparative Example 2 | True | 1.0 |

The devices according to Examples were all found to have excellent responsiveness. It can be seen that the response speed was improved by controlling $\omega_r$. This is due to the speed of taking electrons in and out being faster. Furthermore, it was confirmed that radio waves passed through the proton intercalation devices according to Examples even when they are colored.

Examples 1C to 3C and Comparative Examples 1C and 2C

Gas sensors were produced as follows, using the nano metal compound particles of Examples 1 to 3 and Comparative Examples 1 and 2. A Pt electrode was formed on a substrate, and a porous film made of nano metal compound particles was formed on the Pt electrode. The porous films were unified to have a vacancy rate of 50%, and dimensions of 1 cm in length, 1 cm in width, and 5 μm in thickness.

Next, gas samples having methane gas ($CH_4$ gas) concentrations of 10 wt ppm, 20 wt ppm, 50 wt ppm, and 100 wt ppm were respectively prepared. Resistance values of the porous films after being subjected to each of the gas samples for 1 hour were measured. A resistance value of each of the porous films before being subjected to each of the gas samples containing methane gas is represented by $R_0$, and a resistance value of each of the porous films after being subjected to each of the gas samples is represented by $R_s$. A ratio of change in resistance value was calculated by $[(R_s-R_0)/R_0] \times 100(\%)$. A greater ratio of change in resistance value indicates that the porous film adsorbed more methane gas. That is, this indicates that the sensor has higher sensitivity. The results are shown in Table 4.

TABLE 4

|  | Nano metal compound particles | Ratio of change in resistance value (%) | | | |
|---|---|---|---|---|---|
|  |  | 10 wt ppm | 20 wt ppm | 50 wt ppm | 100 wt ppm |
| Example 1C | Example 1 | 38 | 52 | 55 | 57 |
| Example 2C | Example 2 | 25 | 34 | 37 | 39 |
| Example 3C | Example 3 | 43 | 57 | 60 | 62 |
| Comparative Example 1C | Comparative Example 1 | 21 | 29 | 32 | 33 |
| Comparative Example 2C | Comparative Example 2 | 20 | 27 | 30 | 32 |

Next, in the sensors according to Examples 1C to 3C and Comparative Examples 1C and 2C, the same measurement was performed while irradiating the porous films with ultraviolet rays. For the ultraviolet rays, an LED having an emission peak at 394 nm was used. The results are shown in Table 5.

TABLE 5

|  | Nano metal compound particles | Ratio of change in resistance value when irradiated with ultraviolet rays (%) | | | |
|---|---|---|---|---|---|
|  |  | 10 wt ppm | 20 wt ppm | 50 wt ppm | 100 wt ppm |
| Example 1C | Example 1 | 70 | 81 | 83 | 87 |
| Example 2C | Example 2 | 66 | 75 | 77 | 79 |
| Example 3C | Example 3 | 73 | 87 | 90 | 92 |
| Comparative Example 1C | Comparative Example 1 | 57 | 69 | 72 | 73 |
| Comparative Example 2C | Comparative Example 2 | 55 | 67 | 69 | 72 |

It can be seen from the above Tables that the sensors according to Examples exhibited high rates of change in resistance value.

In the case of irradiating ultraviolet rays thereto, the sensors according to Examples exhibited an even higher rate of change in resistance value. This is because the nano metal compound particles therein were activated, facilitating the intake of electrons.

In the above embodiments, nano metal compound particles were evaluated in the forms of photocatalysts, proton intercalation devices, and sensors; however, the exhibited increased speed of taking electrons in and out serves as a verification that the nano metal compound particles are also effective in semiconductors and battery electrodes. Furthermore, it can be seen that the evaluation method using the spectroscopic ellipsometry method is effective in determining the performance of nano metal compound particles.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. Nano metal compound particles having an average particle size of 50 nm or less, a maximum particle size of 100 nm or less, and a peak $\omega_t$ of 2.8 eV or less, the peak cot corresponding to a resonant frequency of an oscillator according to a spectroscopic ellipsometry method for a batch of nano metal compound particles with a film thickness in a range of 50 nm to 200 nm fitted to a Lorentz model using a theoretical equation shown below:

$$\varepsilon(\omega)=\varepsilon_\infty+f\omega_t^2/\omega_t^2+\omega^2+i\gamma_0\varepsilon$$

wherein $\omega$ denotes a frequency of incident light, $\omega_t$ denotes the oscillator center of the oscillator, $\gamma_0$ denotes a damping factor, f denotes an oscillator strength, $\varepsilon(\omega)$ denotes a permittivity function, $\varepsilon_\infty$ denotes a limit value of high-frequency permittivity function, and i is an imaginary number.

2. The nano metal compound particles according to claim 1, wherein 0.5 eV≤$\omega_t$≤2 eV.

3. The nano metal compound particles according to claim 1, wherein the metal compound particles have an average particle size of 15 nm or less.

4. The nano metal compound particles according to claim 1, comprising one or more materials selected from the group consisting of a metal oxide, a metal sulfide, a metal nitride, and a metal carbide.

5. The nano metal compound particles according to claim 1, wherein the nano metal compound particles have lattice defects.

6. The nano metal compound particles according to claim 1, wherein the nano metal compound particles comprise particles containing a metal oxide, and the metal oxide has an oxygen deficiency.

7. The nano metal compound particles according to claim 1, wherein the nano metal compound particles comprise particles containing a metal oxide, and the metal oxide comprises one or more materials selected from the group consisting of an oxide represented by $WO_{3-x}$ and satisfying 0<x<3, an oxide represented by $MoO_{3-x}$ and satisfying 0<x<3, an oxide represented by $IrO_{2-x}$ and satisfying 0<x<2, an oxide represented by $NiO_{1-x}$, and satisfying 0<x<1, and an oxide represented by $TiO_{2-x}$ and satisfying 0<x<2.

8. A coating material comprising the nano metal compound particles according to claim 1.

9. A film comprising the nano metal compound particles according to claim 1.

10. The film according to claim 9, for use in one selected from the group consisting of a semiconductor, a battery electrode, a photocatalyst, a sensor, and an electrochromic device.

11. The film according to claim 9, having a film thickness of 1 μm or less.

12. The film according to claim 9, having a peak $\omega_t$ of 2.8 eV or less, the peak cot corresponding to a resonant frequency of an oscillator according to the spectroscopic ellipsometry method fitted to the Lorentz model.

13. The film according to claim 9, comprising 50% by volume or more of the nano metal compound particles.

14. A method for producing a film, the method comprising:

forming a nano metal compound particle-containing paste film by applying a paste containing the nano metal compound particles according to claim 1; and drying the nano metal compound particle-containing paste film.

* * * * *